(12) United States Patent
Robert et al.

(10) Patent No.: US 12,323,579 B2
(45) Date of Patent: Jun. 3, 2025

(54) EXTENDED MOTION INFORMATION COMPARISON

(71) Applicant: InterDigital CE Patent Holdings, SAS, Paris (FR)

(72) Inventors: Antoine Robert, Cesson-Sevigne (FR); Fabrice Le Leannec, Betton (FR); Philippe Bordes, Cesson-Sevigne (FR); Tangi Poirier, Cesson-Sevigne (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 147 days.

(21) Appl. No.: 17/619,445

(22) PCT Filed: Sep. 23, 2020

(86) PCT No.: PCT/EP2020/076460
§ 371 (c)(1),
(2) Date: Dec. 15, 2021

(87) PCT Pub. No.: WO2021/058498
PCT Pub. Date: Apr. 1, 2021

(65) Prior Publication Data
US 2022/0103811 A1 Mar. 31, 2022

(30) Foreign Application Priority Data
Sep. 26, 2019 (EP) .................................... 19306201

(51) Int. Cl.
*H04N 19/105* (2014.01)
*H04N 19/159* (2014.01)
(Continued)

(52) U.S. Cl.
CPC ......... *H04N 19/105* (2014.11); *H04N 19/159* (2014.11); *H04N 19/176* (2014.11); *H04N 19/82* (2014.11)

(58) Field of Classification Search
CPC .. H04N 19/105; H04N 19/159; H04N 19/176; H04N 19/517; H04N 19/52; H04N 19/82
See application file for complete search history.

(56) References Cited

U.S. PATENT DOCUMENTS 9,807,396 B2   10/2017 Zhao et al.
10,027,981 B2   7/2018 Xu et al.
(Continued)

FOREIGN PATENT DOCUMENTS

CN   103748880 A   4/2014
CN   104054349 A   9/2014
(Continued)

OTHER PUBLICATIONS

Solovyev et al., "Non-CE4: On switchable interpolation filter and bi-prediction weight indices cleanup", Document: JVET-P0856-v1, Joint Video Experts Team (JVET) of ITU-T SG 16 WP 3 and ISO/IEC JTC 1/SC 29/WG 11, 16th Meeting: Geneva, pp. 1-6, CH, Oct. 1-11, 2019.
(Continued)

*Primary Examiner* — Kathleen V Nguyen
(74) *Attorney, Agent, or Firm* — Condo Roccia Koptiw LLP (57) ABSTRACT

In some coding modes, such as the merge mode, a list of motion candidates is generated using spatial or temporal neighboring blocks or constructed ones, and one of the motion candidates is inherited by the current block. When constructing the list of motion candidates, motion information of a candidate to be added is checked to limit the redundancy in the constructed list. In one implementation, the switchable interpolation filter, the IFindex becomes part of the motion information to be used in comparison since it can modify the resulting prediction. Furthermore, the GBiIdx indicating the weights used in bi-prediction can also be part of the motion information to be compared and could (Continued)

also be taken into account in the redundancy check. In general, all or part of motion information that causes different prediction can be used in redundancy check.

11 Claims, 6 Drawing Sheets

(51) Int. Cl.
*H04N 19/176* (2014.01)
*H04N 19/82* (2014.01)

(56) References Cited

U.S. PATENT DOCUMENTS

| | | | |
|---|---|---|---|
| 10,306,256 | B2 | 5/2019 | Laroche |
| 11,206,407 | B2 | 12/2021 | Lim et al. |
| 11,509,930 | B2 | 11/2022 | Lim et al. |
| 2022/0014791 | A1* | 1/2022 | Liu ............... H04N 19/517 |
| 2022/0060687 | A1* | 2/2022 | Jang ............... H04N 19/573 |

FOREIGN PATENT DOCUMENTS

| | | | |
|---|---|---|---|
| CN | 107079161 A | 8/2017 | |
| CN | 109196864 A | 1/2019 | |
| CN | 109479141 A | 3/2019 | |
| GB | 201909057 A | 12/2020 | |
| KR | 10-2012-0079862 A | 7/2012 | |
| WO | WO-2017197146 A1 * | 11/2017 | ........... H04N 19/105 |

OTHER PUBLICATIONS

Wang et al., "CE4-related: On inheritance of half-pel interpolation filter in merge mode", Document: JVET-P0260-v1, Joint Video Experts Team (JVET) of ITU-T SG 16, WP 3 and ISO/IEC JTC 1/SC 29/WG 11, 16th Meeting: Gevena, pp. 1-8, CH, Oct. 1-11, 2019.

Robert et al., "Motion information comparison", Document: JVET-P0621, Joint Video Experts Team (JVET) of ITU-T SG 16 WP 3 and ISO/IEC JTC 1/SC 29/WG 11, 16th Meeting: Geneva, CH, pp. 1-4, Oct. 1-11, 2019.

Chen et al., "Algorithm description for Versatile Video Coding and Test Model 6 (VTM 6)", Document: JVET-O2002-v1, Joint Video Experts Team (JVET) of ITU-T SG 16 WP 3 and ISO/IEC JTC 1/SC 29/WG11, 15th Meeting: Gothenburg, SE, pp. 1-80, Jul. 3-12, 2019.

McCann et al., "HM3: High Efficiency Video Coding (HEVC) Test Model 3 Encoder Description", Document: JCTVC-E602, Joint Collaborative Team on Video Coding (JCT-VC) of ITU-T SG16 WP3 and ISO/IEC JTC1/SC29/WG11, 5th Meeting: Geneva, CH, pp. 1-35, Mar. 16-23, 2011.

Zhang et al., "3D-CE5.h related: Improved merge mode for inter-view predicted motion", Document: JCT2-A0096, Joint Collaborative Team on 3D Video Coding Extension Development of ITU-T SG 16 WP 3 and ISO/IEC JTC 1/SC 29/WG 11, 1st Meeting: Stockholm, SE, pp. 1-4, Jul. 16-20, 2012.

Bross et al., "Versatile Video Coding (Draft 6)", Document: JVET-O2001-v7, Joint Video Experts Team (JVET) of ITU-T SG 16 WP 3 and ISO/IEC JTC 1/SC 29/WG 11, 15th Meeting: Gothenburg, SE, pp. 1-84, Jul. 3-12, 2019.

Henkel, et al., "CE4: Switchable interpolation filter (CE4-1.1, CE4-1.2, CE4-1.3, CE4-1.4, CE4-1.5, CE4-1.6, CE4-1.7)", Document: JVET-O0057-v2, Joint Video Experts Team (JVET) of ITU-T SG 16 WP 3 and ISO/IEC JTC 1/SG 29/WG 11, 15th Meeting: Gothenburg, SE, pp. 1-10, Jul. 3-12, 2019.

Bross et al., "Versatile Video Coding (Draft 6)", Document: JVET-O2001-vE, Joint Video Experts Team (JVET) of ITU-T SG 16 WP 3 and ISO/IEC JTC 1/SC 29/WG 11, 15th Meeting: Gothenburg, SE, pp. 1-455, Jul. 3-12, 2019.

Zhang, "Research On High Efficiency Inter Coding In Video Compression", Jan. 2017, 157 pages.

* cited by examiner

| Filter | Coefficients h[i] |
|--------|-------------------|
| HEVC | [-1  4 -11  40  40 -11  4 -1] |
| Flat Top | [ -3  4  31  31  4 -3 ] |
| Gauss | [ 3  9  20  20  9  3 ] |

EXTENDED MOTION INFORMATION COMPARISON

This application claims the benefit, under 35 U.S.C. § 371 of International Application No. PCT/EP2020/076460, filed Sep. 23, 2020, which was published on Apr. 1, 2021, which claims the benefit of European Patent Application No. EP19306201.5 filed Sep. 26, 2019.

TECHNICAL FIELD

The present embodiments generally relate to motion information comparison in video encoding and decoding.

BACKGROUND

To achieve high compression efficiency, image and video coding schemes usually employ prediction and transform to leverage spatial and temporal redundancy in the video content. Generally, intra or inter prediction is used to exploit the intra or inter picture correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

According to an embodiment, a method of video encoding or decoding is provided, comprising: accessing a list of motion candidates for a block; accessing motion information of a neighboring block of said block; comparing said motion information of said neighboring block with motion information of a motion candidate in said list of motion candidates, wherein said comparison considers interpolation filter information; responsive to said motion information of said neighboring block being different from said motion information of said motion candidate in said list of motion candidates, adding said neighboring block as a candidate to said list of motion candidates; and encoding or decoding motion information of said block based on said list of motion candidates.

According to another embodiment, an apparatus for video encoding or decoding is provided, comprising one or more processors, wherein said one or more processors are configured to: access a list of motion candidates for a block; access motion information of a neighboring block of said block; compare said motion information of said neighboring block with motion information of a motion candidate in said list of motion candidates, wherein said comparison considers interpolation filter information; responsive to said motion information of said neighboring block being different from said motion information of said motion candidate in said list of motion candidates, add said neighboring block as a candidate to said list of motion candidates; and encode or decode motion information of said block based on said list of motion candidates.

One or more embodiments also provide a computer program comprising instructions which when executed by one or more processors cause the one or more processors to perform the encoding method or decoding method according to any of the embodiments described above. One or more of the present embodiments also provide a computer readable storage medium having stored thereon instructions for encoding or decoding video data according to the methods described above. One or more embodiments also provide a computer readable storage medium having stored thereon a bitstream generated according to the methods described above. One or more embodiments also provide a method and apparatus for transmitting or receiving the bitstream generated according to the methods described above.

DETAILED DESCRIPTION

Figure 1:
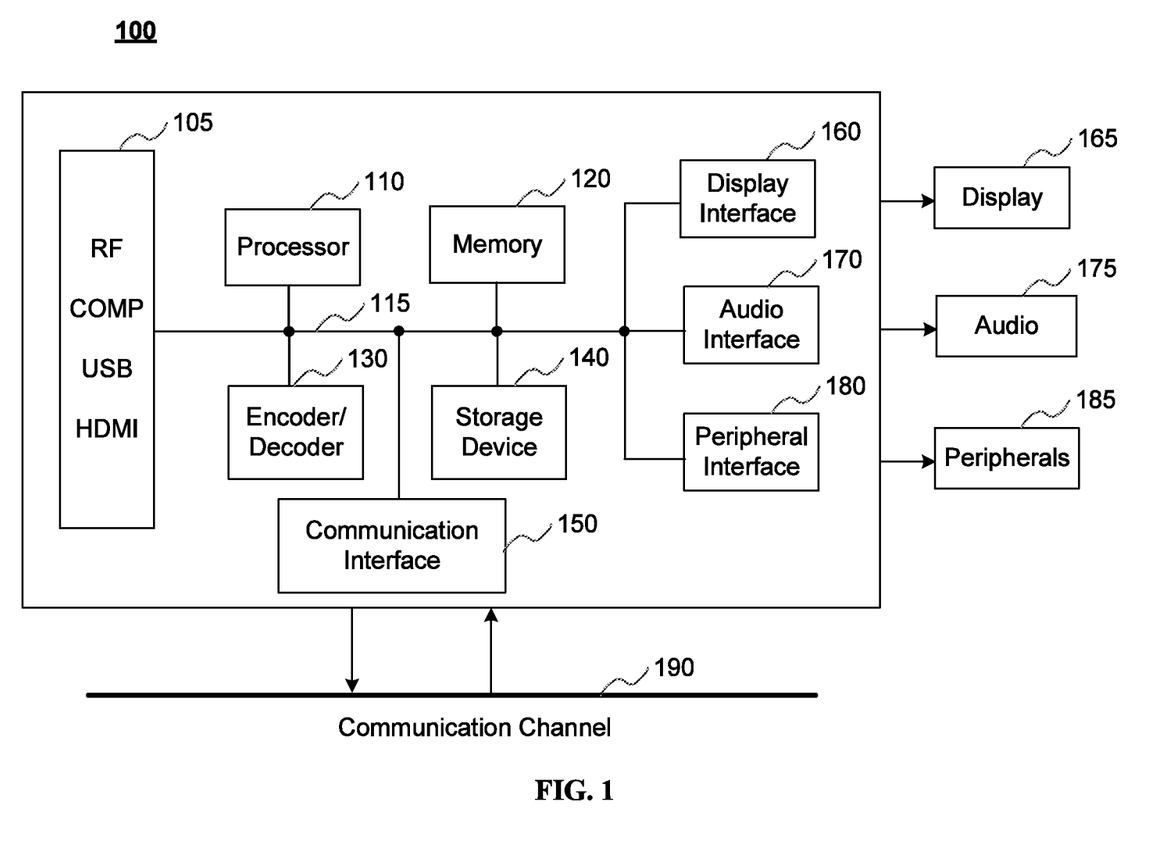
FIG. 1 illustrates a block diagram of a system within which aspects of the present embodiments may be implemented.

FIG. 1 illustrates a block diagram of an example of a system in which various aspects and embodiments can be implemented. System 100 may be embodied as a device including the various components described below and is configured to perform one or more of the aspects described in this application. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 100, singly or in combination, may be embodied in a single integrated circuit, multiple ICs, and/or discrete components. For example, in at least one embodiment, the processing and encoder/decoder elements of system 100 are distributed across multiple ICs and/or discrete components. In various embodiments, the system 100 is communicatively coupled to other systems, or to other electronic devices, via, for example, a communications bus or through dedicated input and/or output ports. In various embodiments, the system 100 is configured to implement one or more of the aspects described in this application.

The system 100 includes at least one processor 110 configured to execute instructions loaded therein for implementing, for example, the various aspects described in this application. Processor 110 may include embedded memory, input output interface, and various other circuitries as known in the art. The system 100 includes at least one memory 120 (e.g., a volatile memory device, and/or a non-volatile memory device). System 100 includes a storage device 140, which may include non-volatile memory and/or volatile memory, including, but not limited to, EEPROM, ROM, PROM, RAM, DRAM, SRAM, flash, magnetic disk drive, and/or optical disk drive. The storage device 140 may include an internal storage device, an attached storage device, and/or a network accessible storage device, as non-limiting examples.

System 100 includes an encoder/decoder module 130 configured, for example, to process data to provide an encoded video or decoded video, and the encoder/decoder module 130 may include its own processor and memory. The encoder/decoder module 130 represents module(s) that may be included in a device to perform the encoding and/or decoding functions. As is known, a device may include one or both of the encoding and decoding modules. Additionally, encoder/decoder module 130 may be implemented as a separate element of system 100 or may be incorporated within processor 110 as a combination of hardware and software as known to those skilled in the art.

Program code to be loaded onto processor 110 or encoder/decoder 130 to perform the various aspects described in this application may be stored in storage device 140 and subsequently loaded onto memory 120 for execution by processor 110. In accordance with various embodiments, one or more of processor 110, memory 120, storage device 140, and encoder/decoder module 130 may store one or more of various items during the performance of the processes described in this application. Such stored items may include, but are not limited to, the input video, the decoded video or portions of the decoded video, the bitstream, matrices, variables, and intermediate or final results from the processing of equations, formulas, operations, and operational logic.

In several embodiments, memory inside of the processor 110 and/or the encoder/decoder module 130 is used to store instructions and to provide working memory for processing that is needed during encoding or decoding. In other embodiments, however, a memory external to the processing device (for example, the processing device may be either the processor 110 or the encoder/decoder module 130) is used for one or more of these functions. The external memory may be the memory 120 and/or the storage device 140, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC.

The input to the elements of system 100 may be provided through various input devices as indicated in block 105. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 105 have associated respective input processing elements as known in the art. For example, the RF portion may be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which may be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 100 to other electronic devices across USB and/or HDMI connections. It is to be understood that various aspects of input processing, for example, Reed-Solomon error correction, may be implemented, for example, within a separate input processing IC or within processor 110 as necessary. Similarly, aspects of USB or HDMI interface processing may be implemented within separate interface ICs or within processor 110 as necessary. The demodulated, error corrected, and demultiplexed stream is provided to various processing elements, including, for example, processor 110, and encoder/decoder 130 operating in combination with the memory and storage elements to process the datastream as necessary for presentation on an output device.

Various elements of system 100 may be provided within an integrated housing, Within the integrated housing, the various elements may be interconnected and transmit data therebetween using suitable connection arrangement 115, for example, an internal bus as known in the art, including the I2C bus, wiring, and printed circuit boards.

The system 100 includes communication interface 150 that enables communication with other devices via communication channel 190. The communication interface 150 may include, but is not limited to, a transceiver configured to transmit and to receive data over communication channel 190. The communication interface 150 may include, but is not limited to, a modem or network card and the communication channel 190 may be implemented, for example, within a wired and/or a wireless medium.

Data is streamed to the system 100, in various embodiments, using a Wi-Fi network such as IEEE 802.11. The Wi-Fi signal of these embodiments is received over the communications channel 190 and the communications interface 150 which are adapted for Wi-Fi communications. The communications channel 190 of these embodiments is typically connected to an access point or router that provides access to outside networks including the Internet for allowing streaming applications and other over-the-top communications. Other embodiments provide streamed data to the system 100 using a set-top box that delivers the data over the HDMI connection of the input block 105. Still other embodiments provide streamed data to the system 100 using the RF connection of the input block 105.

The system 100 may provide an output signal to various output devices, including a display 165, speakers 175, and other peripheral devices 185. The other peripheral devices 185 include, in various examples of embodiments, one or more of a stand-alone DVR, a disk player, a stereo system, a lighting system, and other devices that provide a function based on the output of the system 100. In various embodiments, control signals are communicated between the system 100 and the display 165, speakers 175, or other peripheral devices 185 using signaling such as AV.Link, CEC, or other communications protocols that enable device-to-device control with or without user intervention. The output devices may be communicatively coupled to system 100 via dedicated connections through respective interfaces 160, 170, and 180. Alternatively, the output devices may be connected to system 100 using the communications channel 190 via the communications interface 150. The display 165 and speakers 175 may be integrated in a single unit with the other components of system 100 in an electronic device, for example, a television. In various embodiments, the display interface 160 includes a display driver, for example, a timing controller (T Con) chip.

The display 165 and speaker 175 may alternatively be separate from one or more of the other components, for example, if the RF portion of input 105 is part of a separate set-top box. In various embodiments in which the display 165 and speakers 175 are external components, the output signal may be provided via dedicated output connections, including, for example, HDMI ports, USB ports, or COMP outputs.

Figure 2:
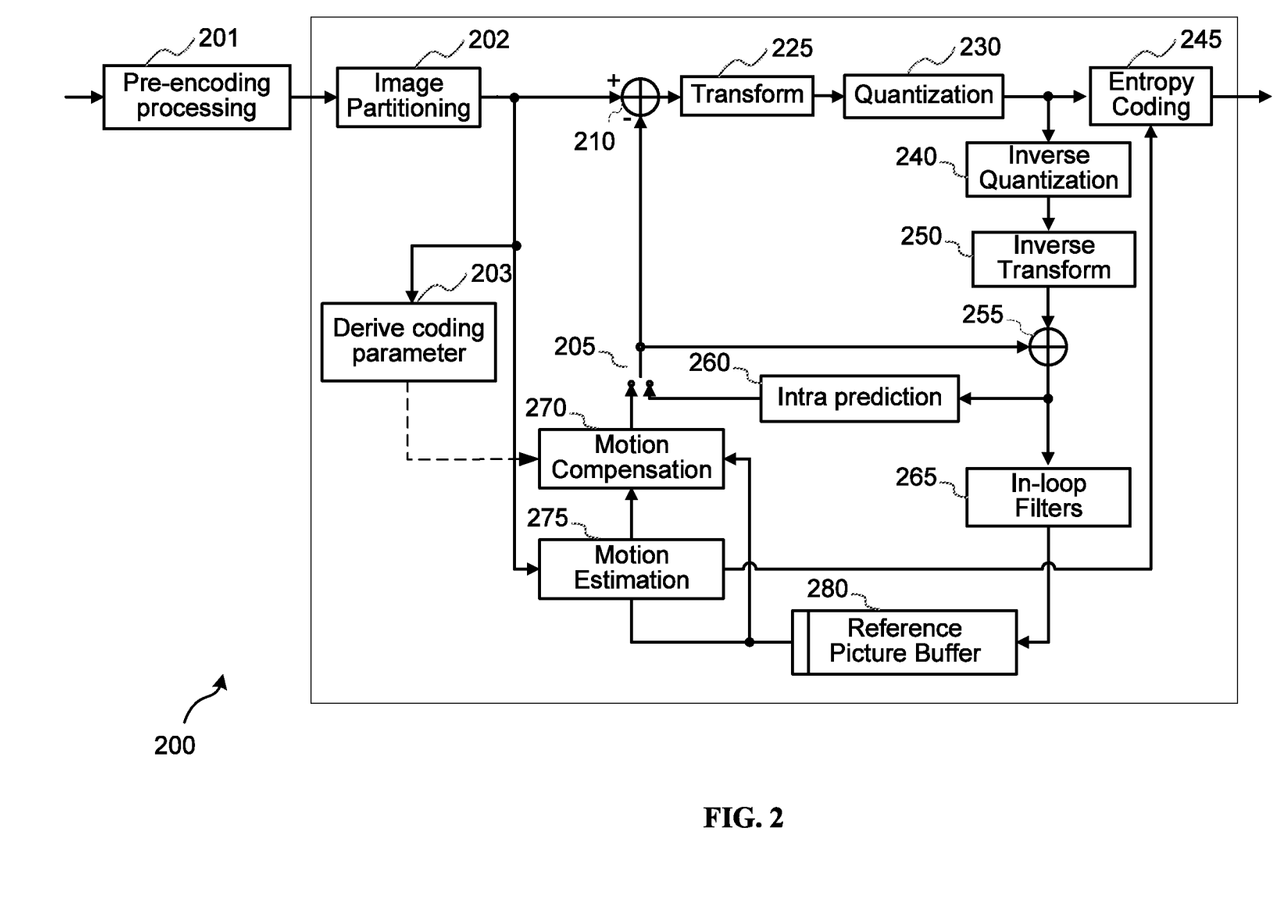
FIG. 2 illustrates a block diagram of an embodiment of a video encoder.

FIG. 2 illustrates an example video encoder 200, such as a High Efficiency Video Coding (HEVC) encoder. FIG. 2 may also illustrate an encoder in which improvements are made to the HEVC standard or an encoder employing technologies similar to HEVC, such as a VVC (Versatile Video Coding) encoder under development by JVET (Joint Video Exploration Team).

In the present application, the terms "reconstructed" and "decoded" may be used interchangeably, the terms "encoded" or "coded" may be used interchangeably, and the terms "image," "picture" and "frame" may be used interchangeably. Usually, but not necessarily, the term "reconstructed" is used at the encoder side while "decoded" is used at the decoder side.

Before being encoded, the video sequence may go through pre-encoding processing (201), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

To encode a video sequence with one or more pictures, a picture is partitioned (202), for example, into one or more slices where each slice can include one or more slice segments. In HEVC, a slice segment is organized into coding units, prediction units, and transform units. The HEVC specification distinguishes between "blocks" and "units," where a "block" addresses a specific area in a sample array (e.g., luma, Y), and the "unit" includes the collocated blocks of all encoded color components (Y, Cb, Cr, or monochrome), syntax elements, and prediction data that are associated with the blocks (e.g., motion vectors).

For coding according to HEVC, a picture is partitioned into coding tree blocks (CTB) of square shape with a configurable size (typically at 64×64, 128×128, or 256×256 pixels), and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). A Transform Block (TB) larger than 4×4 is divided into 4×4 sub-blocks of quantized coefficients called Coefficient Groups (CG). Corresponding to the Coding Block, Prediction Block, and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB, and TB of the luma component applies to the corresponding CU, PU, and TU. In the present application, the term "block" can be used to refer, for example, to any of CTU, CU, PU, TU, CG, CB, PB, and TB. In addition, the term "block" can also be used to refer to a macroblock and a partition as specified in H.264/AVC or other video coding standards, and more generally to refer to an array of data of various sizes.

In the encoder 200, a picture is encoded by the encoder elements as described below. The picture to be encoded is processed in units of, for example, CUs. Each coding unit is encoded using either an intra or inter mode. When a coding unit is encoded in an intra mode, it performs intra prediction (260). In an inter mode, motion estimation (275) and compensation (270) are performed. The construction of the merge lists (regular merge, MMVD (Merge with MVD), triangle, CIIP (Combined Intra/Inter Prediction), IBC (Intra Block Copy)) is performed (203) by inheritance from neighboring CUs (spatial), collocated CUs (temporal), from HMVP (History-based Motion Vector Prediction) list, or constructed (pairwise and zeros). The encoder decides (205) which one of the intra mode or inter mode to use for encoding the coding unit, and indicates the intra/inter decision by a prediction mode flag. Prediction residuals are calculated by subtracting (210) the predicted block from the original image block.

The prediction residuals are then transformed (225) and quantized (230). The quantized transform coefficients, as well as motion vectors and other syntax elements, are entropy coded (245) to output a bitstream. As a non-limiting example, context-based adaptive binary arithmetic coding (CABAC) can be used to encode syntax elements into the bitstream.

The encoder may also skip the transform and apply quantization directly to the non-transformed residual signal, for example, on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. In-loop filters (265) are applied to the reconstructed picture, for example, to perform deblocking/SAO (Sample Adaptive Offset) filtering to reduce encoding artifacts. The filtered image is stored at a reference picture buffer (280).

Figure 3:
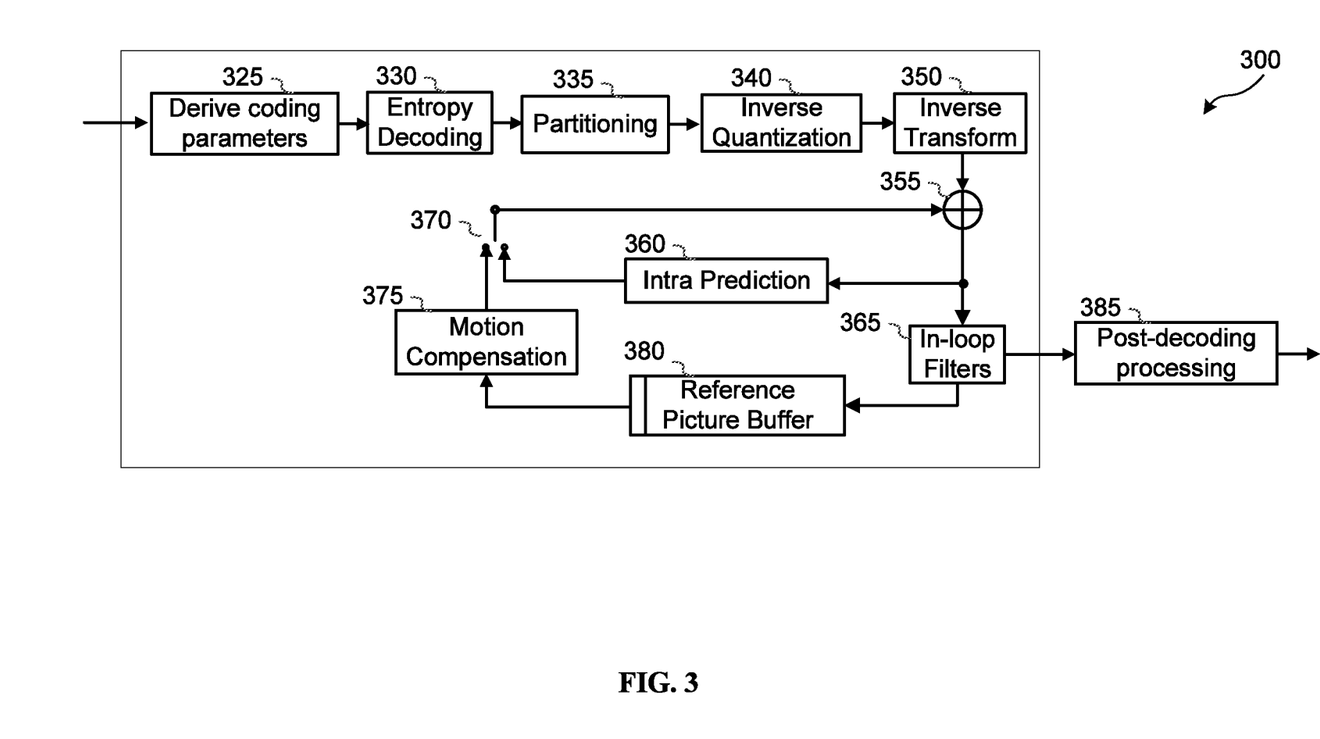
FIG. 3 illustrates a block diagram of an embodiment of a video decoder.

FIG. 3 illustrates a block diagram of an example video decoder 300, such as an HEVC decoder. In the decoder 300, a bitstream is decoded by the decoder elements as described below. Video decoder 300 generally performs a decoding pass reciprocal to the encoding pass as described in FIG. 2, which performs video decoding as part of encoding video data. FIG. 3 may also illustrate a decoder in which improvements are made to the HEVC standard or a decoder employing technologies similar to HEVC, such as a VVC decoder.

In particular, the input of the decoder includes a video bitstream, which may be generated by video encoder 200. The bitstream is entropy decoded (330) to obtain transform coefficients, motion vectors, picture partitioning information, and other coded information. If CABAC is used for entropy coding, the context models are initialized in the same manner as the encoder context models, and syntax elements are decoded from the bitstream based on the context models. The construction of the merge lists (regular merge, MMVD, triangle CIIP, IBC) is performed (325) by inheritance from neighboring CUs (spatial), collocated CUs (temporal), from HMVP list, or constructed (pairwise and zeros).

The picture partitioning information indicates how the picture is partitioned, for example, the size of the CTUs, and a manner a CTU is split into CUs, and possibly into PUs when applicable. The decoder may therefore divide (335) the picture, for example, into CTUs, and each CTU into CUs, according to the decoded picture partitioning information. The transform coefficients are de-quantized (340) and inverse transformed (350) to decode the prediction residuals.

Combining (355) the decoded prediction residuals and the predicted block, an image block is reconstructed. The predicted block may be obtained (370) from intra prediction (360) or motion-compensated prediction (i.e., inter prediction) (375). In-loop filters (365) are applied to the reconstructed image. The filtered image is stored at a reference picture buffer (380).

The decoded picture can further go through post-decoding processing (385), for example, an inverse color transform (e.g., conversion from YCbCr 4:2:0 to RGB 4:4:4) or an inverse remapping performing the inverse of the remapping process performed in the pre-encoding processing (201). The post-decoding processing may use metadata derived in the pre-encoding processing and signaled in the bitstream.

Switchable Interpolation Filters (IF)

Figure 4:
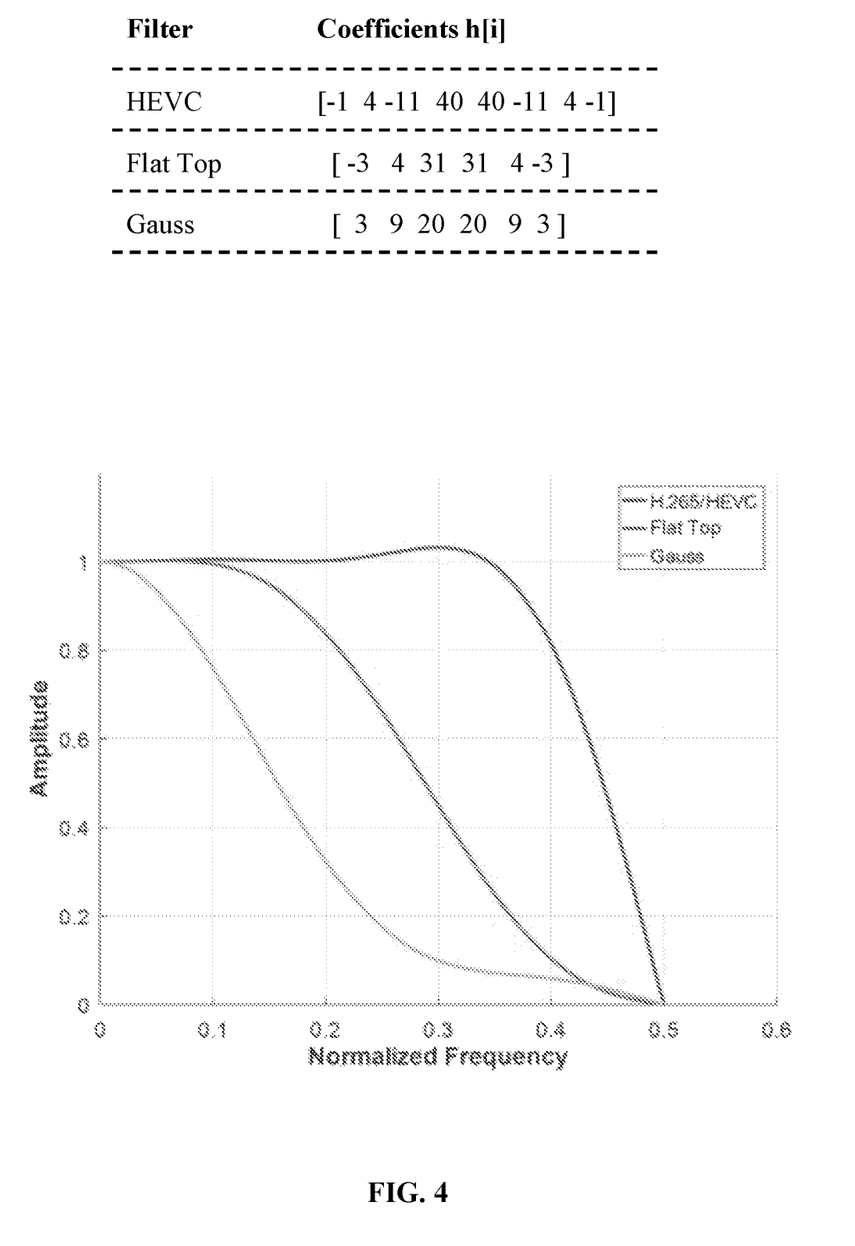
FIG. 4 illustrates interpolation filters with different smoothing characteristics.

The principle of switchable interpolation filter (IF) is to improve the motion compensation prediction by selecting the IF to use for each block prediction. The IFs may differ with smoothing characteristics typically as shown in FIG. 4, which illustrates an example of interpolation filters proposed in JVET-O0057 (see A. Henkel et al., "CE4: Switchable interpolation filter," document JVET-O0057, 15th Meeting: Gothenburg, SE, 3-12 Jul. 2019).

For example, in VVC draft 6 (see "Text of Versatile Video Coding (Draft 6)," document JVET-O2001, 15th Meeting: Gothenburg, SE, 3-12 Jul. 2019) and JVET-O0057, the IF index (IFindex) can be selected per coding unit (CU) and can be derived from the coded "imv" index indicating the resolution of the coded motion vector difference (MVD). In particular, if the MVD resolution is HALF-PEL, then IFindex=1 is selected; otherwise IFindex=0 is selected. In case the coding unit is in Merge mode, the IF index is not coded explicitly but derived from merge candidate(s).

Figure 5:
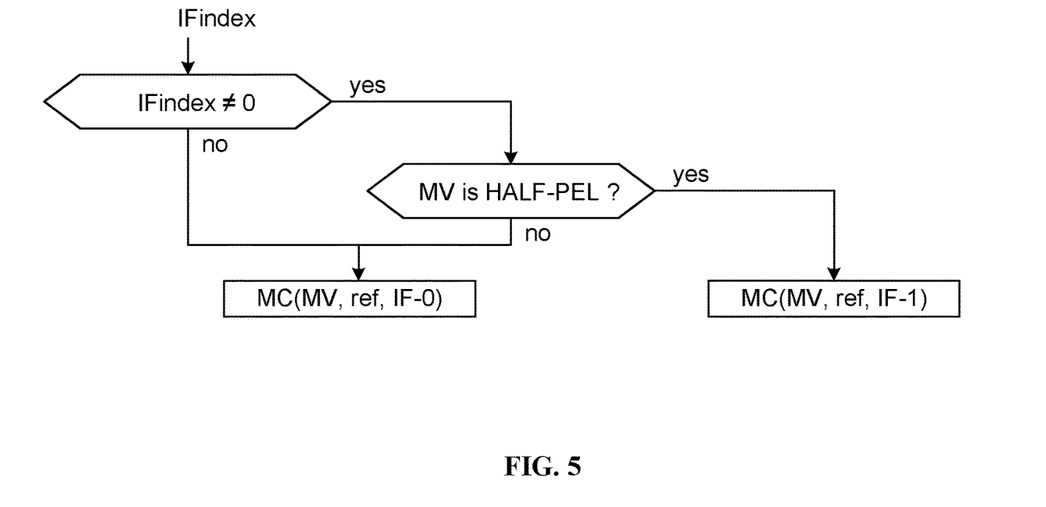
FIG. 5 illustrates the derivation of the interpolation filter based on the value of IFindex and MV.

In VVC draft 6 and JVET-O0057, IFindex value can be one among two filters (IF-0 or IF-1), but IF-1 can be used for HALF-PEL motion vector values only. Then if IFindex is not equal to zero and the MV horizontal (or vertical) component is not HALF-PEL, then IF-0 is used as illustrated in FIG. 5, which illustrates that the value of "IFindex" and "MV" allow deriving the motion compensation filter.

In the following, we will consider N=2 IF filters (IF-0 and IF-1) for simplification. But the present principles can be applied to the case N>2 (IF-0, . . . IF-(N−1)). In this case, one distinguishes the case IFindex=0 and IFindex≠0 that correspond to IF-0 and IF-1 in the following. Also, filter IF-0 (IF-default) is considered as the "default filter". Note that the present principles can also be applied when the interpolation filter is applied to motion vectors that are not HALF-PEL.

Bi-Prediction with CU-Level Weighting (a.k.a. GBI or BPWA or BCW)

In traditional bi-prediction, the prediction sample (biPred [x]) is built by averaging two motion compensated unidirectional prediction samples (ref$_i$[x+mv$_i$], i=0, 1) with equal weights (w$_0$=1, w$_1$=1):

$$biPred[x]=(w_0 \cdot ref_0[x+mv_0]+w_1 \cdot ref_1[x+mv_1]+1)/2$$

In case of generalized bi-prediction (a.k.a. GBI, BPWA or BCW), the weights (w$_0$, w$_1$) are not necessarily equal and are signaled in the bitstream (or inherited in merge mode) as an index in a lookup table (GBiIdx).

In several coding modes (for example, merge modes such as regular merge, MMVD, triangle, CIIP, IBC) that inherit candidates from neighboring ones (spatial, temporal or constructed), some pruning is performed to limit the redundancy in the constructed list. This pruning is performed by comparing sets of motion information to differentiate sets that have different motions.

However, with the newly adopted switchable interpolation filter, the "IFindex" becomes part of the motion information (since it can modify the resulting prediction), but it is not considered by the current pruning. Furthermore, the GBiIdx can also be part of the motion information and could also be taken into account in the pruning.

Motion Information

In VVC draft 6, a set of motion information, stored spatially at a 4×4 level for inheritance purpose, is composed of:

TABLE 1 motion information with associated size.

| Parameter name | Parameter size | Comments |
| --- | --- | --- |
| isInter | 1 b | Is it information from an Inter coded CU |
| isIBC | 1 b | Is it information from an IBC coded CU |
| sliceIdx | 16 b | From which slice information comes |
| interDir | 8 b | Uni-directional or bi-directional information |
| IFindex | 1 b | Use an alternative interpolation filter in MC |
| GBiIdx | 8 b | Index in LUT of GBi weights to use for MC |
| Mv[2] | 32 * 2(dir) * 2(list) = 128 b | Motion vectors for both lists |
| refIdx[2] | 16 * 2(list) = 32 b | Reference frames in both lists |

In all coding modes except HMVP update and load, the GBi index is only stored at the CU level and not in the motion information at the 4×4 level. The GBiIdx stored in this motion information is, in VTM-6.0 (VVC Test Model 6.0), only used by the HMVP list (updates and loads), the other modes use the GBiIdx stored at the CU level.

HMVP uses a FIFO list of previously used predictions, for which it needs all the motion information (as well as the GBiIdx). Note that GBiIdx is CU level information as Motion Information (MI) but MI is saved on a 4×4 basis (i.e., a 16×16 CU holds one GBiIdx and 16 MI), and GBiIdx in MI is only used by HMVP that saves MI and not CU info. Each time a CU is inter coded, its motion information is added into the HMVP list. Each time a merge list is constructed, some candidates are chosen into the HMVP list (from end to beginning, i.e., from older to the most recent one). In the HMVP list, MI is decorrelated from the corresponding CU, so MI needs to contain GBiIdx. In all other inter coding modes, MI are always linked to the corresponding CU that hold the GBiIdx (so no need in MI).

Motion Information Comparison

In VVC, motion information comparison is performed in two different ways, one when the motion information is fully available and a second one when only partial motion information is accessible.

The comparison that has access to the full motion information of the spatial neighbors (stored in the memory at the 4×4 level) is currently used in: (i) all the merge modes (regular merge, MMVD, triangle, IBC, CIIP), (ii) the HMVP list update and (iii) the motion compensation of subblock CUs.

The goal of this comparison is to check if MIs have the same motion vectors and associated reference frames as described in the VVC draft text, which requires that MIs are inter ones (isInter) from the same slice (sliceIdx) in the same mode (isIBC). Below is an extract of this draft where the derivation of the spatial candidates for the regular merge list is described. It focuses on the top neighbor (B1) after the left one (A1) has been derived:

Extract of VVC draft 6 text: 8.5.2.3 Derivation process for spatial merging candidates. (the comparison of full motion information is underlined)

The variables availableFlagB$_1$, refIdxLXB$_1$, predFlagLXB$_1$ and mvLXB$_1$ are derived as follows:

If one or more of the following conditions are true, availableFlagB$_1$ is set equal to 0, both components of mvLXB$_1$ are set equal to 0, refIdxLXB$_1$ is set equal to −1 and predFlagLXB$_1$ is set equal to 0, with X being 0 or 1, and bcwIdxB$_1$ is set equal to 0:

availableB$_1$ is equal to FALSE.

availableA$_1$ is equal to TRUE and the luma locations (xNbA$_1$, yNbA$_1$) and (xNbB$_1$, yNbB$_1$) have the same motion vectors and the same reference indices.

Otherwise, availableFlagB$_1$ is set equal to 1 and the following . . . .

This comparison of full motion information is illustrated in Table 2.

TABLE 2 parameters compared during comparison of full motion information in VVC draft 6.

| Parameter name | Parameter size | Compared |
|---|---|---|
| isInter | 1 b | yes |
| isIBC | 1 b | yes |
| sliceIdx | 16 b | yes |
| interDir | 8 b | yes |
| IFindex | 1 b | no |
| GBiIdx | 8 b | no |
| Mv[2] | 32 * 2(dir) * 2(list) = 128 b | yes |
| refIdx[2] | 16 * 2(list) = 32 b | yes |

The comparison of partial motion information, which is only used when adding a HMVP candidate into a regular merge list, compares only part of the motion information as shown in Table 3.

TABLE 3 parameters compared during comparison of partial motion information in VVC draft 6

| Parameter name | Parameter size | Compared |
|---|---|---|
| interDir | 8 b | yes |
| IFindex | 1 b | no |
| GBiIdx | 8 b | no |
| Mv[2] | 32 * 2(dir) * 2(list) = 128 b | yes |
| refIdx[2] | 16 * 2(list) = 32 b | yes |

The present embodiments propose to extend the comparisons of motion information, for example, to check if the same prediction will be generated (instead of just motion vectors and reference frames). For that purpose, some parameters may be added to motion information comparison. It may make it more robust and potentially simpler for implementations especially hardware implementation.

First Embodiment

In this embodiment, it is proposed to compare all the available parameters such that only a simple memory comparison is required, i.e., a single comparison of the complete structure instead of numerous structure accesses and comparisons.

"IFindex" and "GBiIdx" can modify the resulting prediction of a motion information even if the motion vectors and references frames are identical. Therefore, such parameters can be added into the comparisons.

In that case, Table 2 and Table 3 become Table 4 and Table 5, respectively.

TABLE 4 all parameters compared during comparison of full motion information.

| Parameter name | Parameter size | Compared |
|---|---|---|
| isInter | 1 b | yes |
| isIBC | 1 b | yes |
| sliceIdx | 16 b | yes |
| interDir | 8 b | yes |
| IFindex | 1 b | yes |
| GBiIdx | 8 b | yes |
| Mv[2] | 32 * 2(dir) * 2(list) = 128 b | yes |
| refIdx[2] | 16 * 2(list) = 32 b | yes |

TABLE 5 all parameters compared during comparison of partial motion information.

| Parameter name | Parameter size | Compared |
|---|---|---|
| interDir | 8 b | yes |
| IFindex | 1 b | yes |
| GBiIdx | 8 b | yes |
| Mv[2] | 32 * 2(dir) * 2(list) = 128 b | yes |
| refIdx[2] | 16 * 2(list) = 32 b | yes |

Accordingly, the draft text becomes:
Extract of VVC draft text: 8.5.2.3 Derivation process for spatial merging candidates.

The variables availableFlagB$_1$, refIdxLXB$_1$, predFlagLXB$_1$ and mvLXB$_1$ are derived as follows:

If one or more of the following conditions are true, availableFlagB$_1$ is set equal to 0, both components of mvLXB$_1$ are set equal to 0, refIdxLXB$_1$ is set equal to −1 and predFlagLXB$_1$ is set equal to 0, with X being 0 or 1, and bcwIdxB$_1$ is set equal to 0:

availableB₁ is equal to FALSE.
availableA₁ is equal to TRUE and the luma locations (xNbA₁, yNbA₁) and xNbB₁, yNbB₁) have the same motion vectors, the same reference indices, the same half sample interpolation filter indices and the same bi-prediction weight indices.

Otherwise, availableFlagB₁ is set equal to 1 and the following . . . .

According to the modified VVC draft as described above, all motion information is compared instead of comparing only motion vectors and reference frames, which need to be from Inter MI (isInter) of the same slice (sliceIdx) in the same mode (isIBC). MI from top candidate B1 are compared to the left one A1. If MI from A1 is equal to MI from B1, then B1 is set unavailable for merge list construction, namely, B1 is considered as redundant with respect to A1 and is pruned from the merge list.

In a variant, it is possible to store the GBiIdx in the motion information at the 4×4 level, instead of at the CU level, for all inter coding modes (not only for HMVP list) in order to improve the performance of such a comparison. As explained above, the GBiIdx is stored at the CU level in VVC draft 6, and it is not stored at the MI (4×4) level. But by storing it at the MI level, it becomes part of the information that can be retrieved by the spatial prediction in merge mode (as it retrieves MI).

In another variant, this embodiment can be extended to any new parameter that has to be added into the motion information because it modifies the resulting prediction coming from this motion information and it has to be inherited by following CUs.

Second Embodiment

In this embodiment, it is proposed to add only IFindex into the comparisons as the GBiIdx is not used everywhere.

Table 2 and Table 3 then become Table 6 and Table 7, respectively.

TABLE 6 parameters compared using full motion information with added IFindex.

| Parameter name | Parameter size | Compared |
|---|---|---|
| isInter | 1 b | yes |
| isIBC | 1 b | yes |
| sliceIdx | 16 b | yes |
| interDir | 8 b | yes |
| IFindex | 1 b | yes |
| GBiIdx | 8 b | no |
| Mv[2] | 32 * 2(dir) * 2(list) = 128 b | yes |
| refIdx[2] | 16 * 2(list) = 32 b | yes |

TABLE 7 parameters compared using partial motion information with added IFindex.

| Parameter name | Parameter size | Compared |
|---|---|---|
| interDir | 8 b | yes |
| IFindex | 1 b | yes |
| GBiIdx | 8 b | no |
| Mv[2] | 32 * 2(dir) * 2(list) = 128 b | yes |
| refIdx[2] | 16 * 2(list) = 32 b | yes |

Accordingly, the draft text become:
Extract of VVC draft text: 8.5.2.3 Derivation process for spatial merging candidates.
The variables availableFlagB₁, refIdxLXB₁, predFlagLXB₁ and mvLXB₁ are derived as follows:
If one or more of the following conditions are true, availableFlagB₁ is set equal to 0, both components of mvLXB₁ are set equal to 0, refIdxLXB₁ is set equal to −1 and predFlagLXB₁ is set equal to 0, with X being 0 or 1, and bcwIdxB₁ is set equal to 0:
availableB₁ is equal to FALSE.
availableA₁ is equal to TRUE and the luma locations (xNbA₁, yNbA₁) and xNbB₁, yNbB₁) have the same motion vectors, the same reference indices and the same half sample interpolation filter indices.

Otherwise, availableFlagB₁ is set equal to 1 and the following

According to the above modified text, instead of comparing only motion vectors and reference frames, which need to be from Inter MI (isInter) of the same slice (sliceIdx) in the same mode (isIBC), the IFindex is also compared. MI from top candidate B1 is compared to the left one A1. If MI of A1 is the same as MI of B1, then B1 is set unavailable for merge list construction.

As GBiIdx of motion information is only used by the HMVP list (updates and loads), these indices are all set to the default value in all other cases (inter coding modes) which do not influence the result of full comparisons. A full comparison will only affect the HMVP list but with a very limited impact.

In a variant, a single full comparison can be used to compare full motion information even if the HMVP list update is slightly impacted.

In another variant, it possible to store and load GBiIdx from the HMVP list in another way than through motion information so that GBiIdx can be completely removed from motion information and therefore full comparisons can be used.

Third Embodiment

In this embodiment, it is proposed to consider all the combinations of parameter comparisons in each process, as illustrated in Table 8. It is possible that only full motion information comparison method is used when motion information comparison is used, such as when the HMVP list is generated.

TABLE 8 added parameter comparisons in each comparison.

| Full motion information | | Partial motion information | | Comment |
|---|---|---|---|---|
| IFindex | GBiIdx | IFindex | GBiIdx | |
| X | X | X | X | Embodiment 1 |
| X | X | X | | Embodiment 2, variant 1 |
| X | X | | X | |
| X | X | | | |
| X | | X | X | |
| X | | X | | Embodiment 2 |
| X | | | X | |
| X | | | | |
| | X | X | X | |
| | X | X | | |
| | X | | X | |

TABLE 8-continued added parameter comparisons in each comparison.

| Full motion information | | Partial motion information | | |
| --- | --- | --- | --- | --- |
| IFindex | GBiIdx | IFindex | GBiIdx | Comment |
|  | X |  |  |  |
|  |  | X | X |  |
|  |  | X |  |  |
|  |  |  | X |  |

In VTM-6.0, the merge list (a list of motion candidates) is constructed by including the following types of predictors (also referred to as candidates):
  1) Spatial MVPs (Motion Vector Predictors) from spatial neighbour CUs;
  2) Temporal MVP from collocated CUs;
  3) History-based MVPs from a FIFO table;
  4) Pairwise average MVP; and
  5) Zero MVPs.

Figure 7:
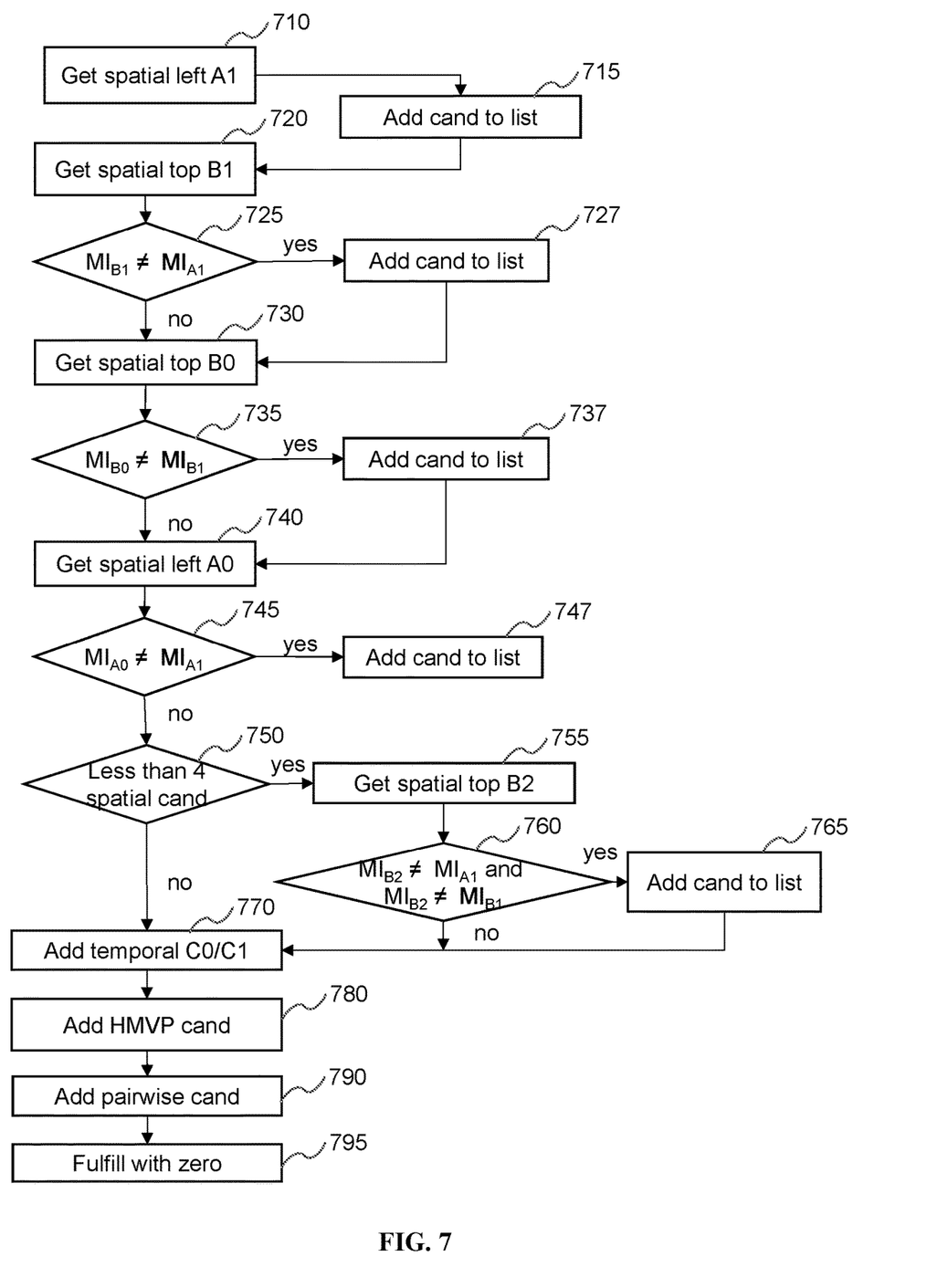
FIG. 7 illustrates the generation process of a merge list.

For each CU coded in the merge mode, the index of the selected predictor is encoded. The generation process of each category of merge candidates is shown in FIG. 7 and described below.

Spatial Candidates Derivation

The derivation of spatial merge candidates in VVC draft 6 is same as in HEVC. A maximum of four merge candidates are selected among candidates located in the positions depicted in FIG. 6. The order of derivation is $A_1$, $B_1$, $B_0$, $A_0$ and $B_2$. After candidate at position $A_1$ is added (710, 715), the addition of the remaining candidates (720, 727, 730, 737, 740, 747, 755, 765) is subject to a redundancy check (725, 735, 745, 760), which ensures that candidates with same motion information are excluded from the list so that coding efficiency is improved. To reduce computational complexity, not all possible candidate pairs are considered in the mentioned redundancy check. Instead only some pairs are considered (725, 735, 745, 760), and a candidate is only added to the list if the corresponding candidate used for redundancy check has not the same motion information. For example, in step 725, motion information for $B_1$ ($MI_{B1}$) is compared with motion information for A1 ($MI_{A1}$), and candidate at position $B_1$ is added to the merge list only if different from candidate at position $A_1$. Position $B_2$ is considered (755, 760, 765) when there are less than four spatial candidates in the list (750).

Temporal Candidate Derivation ("TMVP C0/C1")

Figure 6:
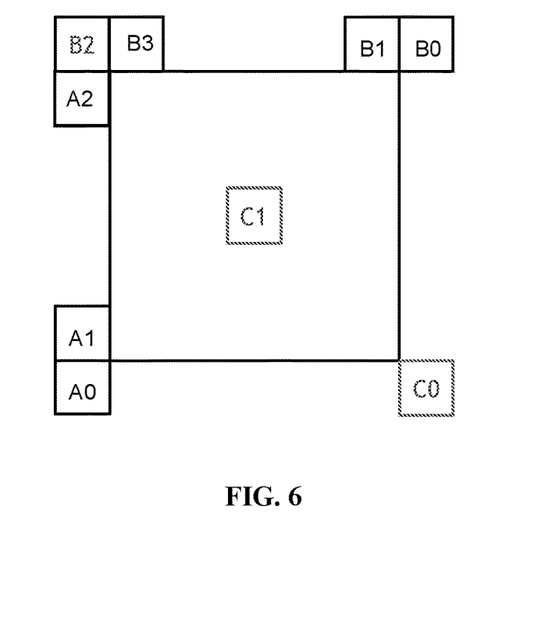
FIG. 6 illustrates positions for spatial and temporal predictors.

Only one temporal candidate is added (770) to the merge list. Particularly, in the derivation of this temporal merge candidate, a scaled motion vector is derived based on co-located CU belonging to the collocated reference picture. The position for the temporal candidate is selected between candidates $C_0$ and $C_1$, as depicted in FIG. 6. If CU at position $C_0$ is not available, is intra coded, or is outside of the current row of CTUs, position $C_1$ is used. Otherwise, position $C_0$ is used in the derivation of the temporal merge candidate.

History-Based Merge Candidates Derivation

The history-based MVP (HMVP) merge candidates are added (780) to the merge list after the spatial MVP and TMVP. To use HMVP, the motion information of a previously coded block stored in a table is used as MVP for the current CU. The table with multiple HMVP candidates is maintained during the encoding/decoding process. The table is reset (emptied) when a new CTU row is encountered. Whenever there is a non-subblock inter-coded CU, the associated motion information is added to the last entry of the table as a new HMVP candidate and if redundant motion information is present, it is removed, otherwise the first entry of the table is removed (the oldest one).

HMVP candidates could be used in the merge candidate list construction process. The latest several HMVP candidates in the table are checked in order and inserted to the candidate list after the TMVP candidate. Redundancy check is applied on the HMVP candidates to some spatial merge candidate. Each of the two last HMVP candidates in the FIFO (the more recent ones) is compared to spatial candidates $A_1$ and $B_1$ and added to the merge list only if it has not the same motion information. Once the total number of available merge candidates reaches the maximally allowed merge candidates minus 1, the merge candidate list construction process from HMVP is terminated.

Pair-Wise Average Merge Candidate Derivation

Pairwise average candidate is generated by averaging the first pair of candidates in the existing merge candidate list. When the merge list is not full after pair-wise average merge candidate is added (790), the zero MVPs are inserted (795) in the end until the maximum merge candidate number is reached.

Different motion comparison methods as described above can be used during the redundancy check (e.g., 725, 735, 745, 760). The motion comparison methods can also be applied when different types of motion candidates are used to construct the merge list, or when the motion candidates are added to the merge list in another order.

At the decoder side, the same process for constructing the merge list is used. Depending on the index of the selected predictor decoded from the bitstream, a motion vector predictor from the merge list is selected as the motion vector predictor for the current CU.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Various methods and other aspects described in this application can be used to modify modules, for example, the modules to derive coding parameters (203, 325), the motion compensation module (270, 375), of a video encoder 200 and decoder 300 as shown in FIG. 2 and FIG. 3. Moreover, the present aspects are not limited to VVC or HEVC, and can be applied, for example, to other standards and recommendations, and extensions of any such standards and recommendations. Unless indicated otherwise, or technically precluded, the aspects described in this application can be used individually or in combination.

Various numeric values are used in the present application. The specific values are for example purposes and the aspects described are not limited to these specific values.

An embodiment provides a computer program comprising instructions which when executed by one or more processors cause the one or more processors to perform the encoding method or decoding method according to any of the embodiments described above. One or more of the present embodiments also provide a computer readable storage medium having stored thereon instructions for encoding or decoding video data according to the methods described above. One or more embodiments also provide a computer readable storage medium having stored thereon a bitstream generated according to the methods described above. One or more embodiments also provide a method and apparatus for transmitting or receiving the bitstream generated according to the methods described above.

Various implementations involve decoding. "Decoding," as used in this application, may encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input video sequence in order to produce an encoded bitstream.

Note that the syntax elements as used herein are descriptive terms. As such, they do not preclude the use of other syntax element names.

The implementations and aspects described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus, for example, a processor, which refers to processing devices in general, including, for example, a computer, a microprocessor, an integrated circuit, or a programmable logic device. Processors also include communication devices, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method of video encoding or decoding, comprising:
accessing a list of motion candidates for a block;
accessing motion information of a neighboring block of said block, said motion information including at least interpolation filter information and information indicating weights used in generalized bi-prediction, wherein said block is larger than 4×4 and said information indicating weights used in generalized bi-prediction is stored at a 4×4 level for all inter coding modes;
comparing said motion information of said neighboring block with motion information of a motion candidate in said list of motion candidates, wherein said comparison considers said interpolation filter information and said information indicating weights used in generalized bi-prediction, wherein a single memory comparison of a complete structure of motion information is used when comparing motion information;

responsive to said motion information of said neighboring block being different from said motion information of said motion candidate in said list of motion candidates, adding said neighboring block as a candidate to said list of motion candidates; and encoding or decoding motion information of said block based on said list of motion candidates.

2. The method of claim 1, wherein said neighboring block is considered redundant with said motion candidate when predictions corresponding to said motion information of said neighboring block and said motion information of said motion candidate are identical.

3. The method of claim 1, wherein said list of motion candidates is used in a merge mode for signaling the motion information for said block.

4. The method of claim 1, wherein said motion information for said block is signaled through an index into said list of motion candidates.

5. The method of claim 1, wherein said list of motion candidates is used by all merge modes.

6. An apparatus for video encoding or decoding, comprising one or more processors, wherein said one or more processors are configured to:

access a list of motion candidates for a block;

access motion information of a neighboring block of said block, said motion information including at least interpolation filter information and information indicating weights used in generalized bi-prediction, wherein said block is larger than 4×4 and said information indicating weights used in generalized bi-prediction is stored at a 4×4 level for all inter coding modes;

compare said motion information of said neighboring block with motion information of a motion candidate in said list of motion candidates, wherein said comparison considers said interpolation filter information and said information indicating weights used in generalized bi-prediction, wherein a single memory comparison of a complete structure of motion information is used when comparing motion information;

responsive to said motion information of said neighboring block being different from said motion information of said motion candidate in said list of motion candidates, add said neighboring block as a candidate to said list of motion candidates; and encode or decode motion information of said block based on said list of motion candidates.

7. The apparatus of claim 6, wherein said neighboring block is considered redundant with said motion candidate when predictions corresponding to said motion information of said neighboring block and said motion information of said motion candidate are identical.

8. The apparatus of claim 6, wherein said list of motion candidates is used in a merge mode for signaling the motion information for said block.

9. The apparatus of claim 6, wherein said motion information for said block is signaled through an index into said list of motion candidates.

10. The apparatus of claim 6, wherein said list of motion candidates is used by all merge modes.

11. A non-transitory computer-readable storage medium storing instructions when executed, implement an encoding or decoding method, the encoding or decoding method comprising:

accessing a list of motion candidates for a block;

accessing motion information of a neighboring block of said block, said motion information including at least interpolation filter information and information indicating weights used in generalized bi-prediction, wherein said block is larger than 4×4 and said information indicating weights used in generalized bi-prediction is stored at a 4×4 level for all inter coding modes;

comparing said motion information of said neighboring block with motion information of a motion candidate in said list of motion candidates, wherein said comparison considers said interpolation filter information and said information indicating weights used in generalized bi-prediction, wherein a single memory comparison of a complete structure of motion information is used when comparing motion information;

responsive to said motion information of said neighboring block being different from said motion information of said motion candidate in said list of motion candidates, adding said neighboring block as a candidate to said list of motion candidates; and encoding or decoding motion information of said block based on said list of motion candidates.

* * * * *